United States Patent [19]
Barden

[11] 3,923,461
[45] Dec. 2, 1975

[54] APPARATUS AND METHOD EMPLOYING GAS-PERMEABLE MEMBRANE FOR SEPARATING, DILUTING, OR CONCENTRATING MOLECULAR SPECIES

[75] Inventor: James D. Barden, Nokesville, Va.

[73] Assignee: Meloy Laboratories, Inc., Springfield, Va.

[22] Filed: June 7, 1974

[21] Appl. No.: 477,463

[52] U.S. Cl. ........... 23/232 R; 23/254 E; 23/255 E; 55/16; 55/158
[51] Int. Cl.² B01D 13/00; B01D 53/22; G01N 31/12
[58] Field of Search .......... 23/232 R, 232 E, 254 R, 23/254 E, 255 R, 255 E; 55/16, 158; 73/23

[56] References Cited
UNITED STATES PATENTS

| | | | |
|---|---|---|---|
| 2,045,379 | 6/1936 | Bennett | 23/254 R X |
| 2,664,779 | 1/1954 | White | 23/254 R X |
| 3,239,996 | 3/1966 | Huffman et al. | 55/16 |
| 3,438,241 | 4/1969 | McKinley, Jr. | 23/232 R X |
| 3,534,528 | 10/1970 | Porter | 55/16 |
| 3,674,435 | 7/1972 | Van Luik, Jr. et al. | 23/232 R |

*Primary Examiner*—Robert M. Reese
*Attorney, Agent, or Firm*—Shapiro and Shapiro

[57] ABSTRACT

A fluid permeation device employs a membrane separating sample gas and carrier gas flow paths at opposite sides thereof, the flow of carrier gas being interrupted from time to time to permit the accumulation of sample gas species which permeate the membrane, and the carrier gas flow being reinstituted to transport the accumulated sample gas species to an analyzer. Greater concentration of sample gas species in the carrier gas is thereby provided.

10 Claims, 3 Drawing Figures

APPARATUS AND METHOD EMPLOYING GAS-PERMEABLE MEMBRANE FOR SEPARATING, DILUTING, OR CONCENTRATING MOLECULAR SPECIES

REFERENCE TO CO-PENDING APPLICATIONS

This invention relates to subject matter disclosed in copending applications Ser. No. 320,660, filed Jan. 2, 1973 and Ser. No. 469,467, filed May 13, 1974, both assigned to the same assignee as the present application and both incorporated herein by reference.

BACKGROUND OF THE INVENTION

This invention relates to the utilization of permeable membranes or the like for separating, diluting, or concentrating molecular species, particularly in connection with gas analysis.

The aforementioned copending application Ser. No. 320,660 discloses a highly effect device employing a gas-permeable membrane for sample dilution, for example. In that device the membrane divides a housing into two parts and separates sample gas and carrier gas flow paths at opposite sides thereof. The device incorporates means for providing precise adjustment and regulation of the temperature of the membrane. Constituents of the sample gas stream permeate the membrane and enter the carrier gas stream, by which they are conveyed to an analyzer, such as a flame photometric detector, for example. Although this device is capable of providing a wide range of sample dilution, especially of virtue of temperature control and variation of membrane area, and although the device is capable of selectively concentrating a sample constituent, such as $SO_2$, relative to an interfering constituent, such as hydrocarbons, a need has existed for even wider range control of the dilution factor, particularly where it is desired to concentrate certain sample constituents relative to others without unduly diluting the desired sample constituents by the carrier gas. Since the mass flow rate of the carrier gas may be dictated by the requirements of the analyzer, the reduction of that rate to reduce the dilution may be impractical.

BRIEF DESCRIPTION OF THE INVENTION

It is accordingly a principal object of the present invention to provide improved apparatus and methods employing gas-permeable membranes or the like for diluting, concentrating, or separating sample constituents.

Briefly stated, in accordance with a preferred embodiment of the invention, a dilution device employing a gas-permeable membrane is provided with a sample gas stream and a carrier gas stream at opposite sides of the membrane as disclosed in the aforementioned copending application Ser. No. 320,660. However, instead of providing a continuous flow of carrier gas at the carrier gas side of the membrane as in that copending application, the present invention employs switching valves to interrupt the flow of carrier gas to the membrane from time to time for controllable periods and then for reinstituting the carrier gas flow. During the time that the carrier gas flow to the membrane is interrupted, sample constituents which permeate the membrane are accumulated at the carrier gas side of the membrane, later being supplied to an analyzer when the carrier gas flow is reinstituted.

BRIEF DESCRIPTION OF THE DRAWINGS

The invention will be further described in conjunction with the accompanying drawings, which illustrate a preferred and exemplary embodiment, and wherein.

DETAILED DESCRIPTION OF THE INVENTION

Figure 1:
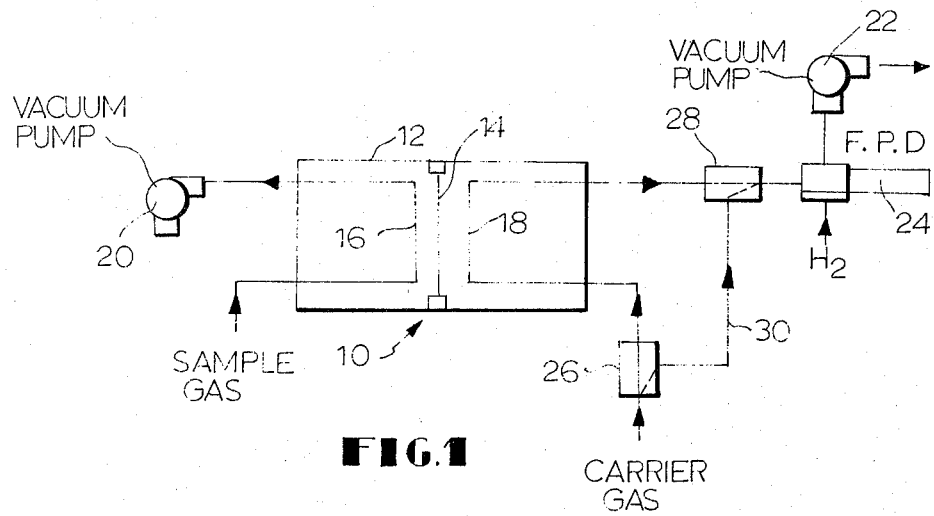
FIG. 1 is a diagrammatic view illustrating the invention.

Referring to the drawings, and initially to FIG. 1 thereof, reference numeral 10 designates a diagrammatically illustrated diluter cartridge of the type disclosed in the aforementioned copending application Ser. No. 320,660. As described in detail therein, the diluter cartridge comprises a housing 12 divided into two parts by a permeable membrane 14 which separates sample gas flow and carrier gas flow paths 16 and 18 at opposite sides thereof. As set forth in that application, the flow paths are provided by means of cores which fit within opposite ends of the housing 12 and which are spaced from the side wall of the housing and from the membrane 14. Electric heaters are provided on the side wall of the housing and a sensor is provided adjacent to the membrane for temperature regulation of the sample and carrier gases, whereby the temperature of the membrane is regulated. In the form shown in FIG. 1, sample gas and carrier gas flow is provided by means of vacuum pumps 20 and 22, although positive pressure sources may also be employed. Vacuum pump 22 supplies the carrier gas (and sample consituents carried thereby) to an appropriate analyzer 24, such as a flame photometric detector, flame ionization detector, or other suitable analyzer. In general, the analyzer will incorporate the usual pneumatic mechanisms for flow control.

In accordance with the present invention, the carrier gas flow path 18 is provided with a pair of solenoid switching valves 26 and 28, which in one position of the valves provide a continuous path from the carrier gas source, past the membrane 14, to the analyzer 24, and which in the alternate position interrupt the flow path (isolating the carrier gas side of the membrane 14) and provide a path directly from the carrier gas source to the analyzer, as indicated at 30. The carrier gas source may be a source of clean air or other gas, which may also be the host gas of the sample. The membrane 14 may be a thin Teflon membrane, for example.

Figure 2:
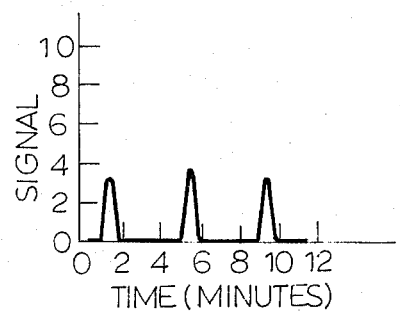
FIG. 2 is a graphical view illustrating one form of analyzer signal output which may be produced in accordance with the invention.
Figure 3:
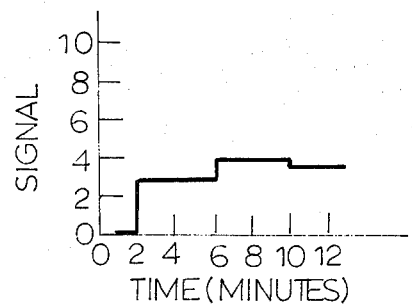
FIG. 3 is a similar view of another form.

In the operation of the invention, sample gas, which may comprise sulfur species in a pure hydrocarbon stream, for example, may be supplied continuously to the flow path 16. The carrier gas flow in path 18 is interrupted from time to time, by operation of valves 26 and 28, and then reinstituted. FIG. 2 represents, illustratively, the recorded output of a flame photometric detector signal versus time. The pulses designate the output signal when the carrier gas flow is reinstituted, the inter-pulse time designating the periods during which the carrier gas flow to the membrane is interrupted. Alternatively, a step function display technique may be employed, as in FIG. 3. Display techniques for providing this type of output are well known. In conjunction with either of the foregoing displays, a plot of dilution factor versus carrier gas interruption interval (obtained from calibration runs) may be employed to derive the actual sample concentration.

The rise in sample gas concentration in the carrier gas at the carrier gas side of the membrane is believed to be illustrated by the following equations, using $SO_2$ as the molecular species of interest:

$$[SO_2]_{CG} = \frac{[SO_2]_{SG} P_m t_i A P_T}{(V_s \Delta X) + (P_m t_i A P_T)} \quad (1)$$

$$K_d = \frac{V_s \Delta X}{P_m t_i A P_T} + 2 \quad (2)$$

where
$[SO_2]_{CG}$ is the $SO_2$ concentration in the carrier gas
$[SO_2]_{SG}$ is the $SO_2$ concentration in the sample gas
$P_m$ is the permeability coefficient of the membrane for $SO_2$,
$t_i$ is the carrier gas flow cut-off interval
$A$ is the area of the membrane
$P_T$ is the total pressure (assumed to be the same on both sides of the membrane)
$V_s$ is the interstitial volume of the carrier side of the membrane between the two switching valves
$\Delta X$ is the thickness of the membrane
$K_d$ is the dilution factor.

By virtue of the invention it is possible to perform membrane dilutions, selective concentrations, and species separations over a wide range without having to change membrane geometry or temperature, although both may be changed for even greater range. The dilution factor range in accordance with the invention may be from 5 to 3500, for example. It is possible to selectively concentrate sulfur species within the detectable range of a flame photometric detector in the presence of undesirable molecular species and to measure 0.1 ppm sulfur species in a pure hydrocarbon stream, for example. The apparatus of the invention may be interfaced with selective sulfur scrubbers for the measurement of specific sulfur species and may be interfaced with other devices, such as a gas chromatograph, to assist in the identification and measurement of multiple sulfur species in a sample stream, for example. The gas flow volume at the carrier gas side of the membrane in path 18 between the switching valves should be minimized to minimize the time of response. It is believed preferable to place all of the apparatus shown in FIG. 1 in a common physical package with appropriate thermal barriers. The switching valves may be cycled automatically and the carrier gas cut-off interval may be varied for predictable variations in dilution factor. It should be noted that although the carrier gas flow to the membrane is interrupted, the flow to the analyzer may be maintained essentially constant.

While a preferred embodiment of the invention has been shown and described, it will be apparent to those skilled in the art that changes can be made in this embodiment without departing from the principles and spirit of the invention, the scope of which is defined in the appended claims.

The invention claimed is:

1. Apparatus for controlling the concentration of sample fluid species in a carrier fluid supplied to a device utilizing said species, which comprises means providing a fluid permeable wall separating sample fluid flow and carrier fluid flow paths at opposite sides thereof, means for connecting said carrier fluid flow path to said device downstream of said apparatus, means for supplying sample fluid to said sample fluid flow path, means for supplying a carrier fluid stream to said carrier fluid flow path and then to said device, and means for interrupting the flow of carrier fluid in the last-mentioned path from time to time and for reinstituting that flow, whereby sample species which permeate said wall during the time of carrier fluid interruption accumulate at the carrier fluid side of said wall until the carrier fluid flow from said stream to said device is reinstituted.

2. Apparatus in accordance with claim 1, said device comprising analyzer means.

3. Apparatus in accordance with claim 2, wherein said means for supplying said sample fluid comprises a source of sulfur species in a hydrocarbon stream, and wherein said analyzer means comprises a flame photometric detector.

4. Apparatus in accordance with claim 2, wherein said interrupting means comprises valve means for isolating a portion of the carrier fluid flow path in the vicinity of said permeable wall.

5. Apparatus in accordance with claim 4, further comprising means for supplying carrier fluid directly to said analyzer means during said isolating.

6. A method of controlling the concentration of sample fluid species in a carrier fluid supplied to a device utilizing said species, which comprises providing a fluid permeable wall separating sample fluid flow and carrier fluid flow paths at opposite sides thereof, supplying sample fluid to said sample fluid flow path, supplying a carrier fluid stream to said carrier fluid flow path and then to said device, interrupting the flow of carrier fluid in the last-mentioned path from time to time and reinstituting that flow, whereby sample species which permeate said wall during the time of carrier fluid interruption accumulate at the carrier fluid side of said wall until the carrier fluid flow from said stream to said device is reinstituted.

7. A method in accordance with claim 6, further comprising analyzing the fluid flow from said carrier fluid stream by analyzer means.

8. A method in accordance with claim 7, wherein said sample fluid is supplied from a source of sulfur species in a hydrocarbon stream, and wherein said analyzing is effected by a flame photometric detector.

9. A method in accordance with claim 7, wherein said interrupting comprises isolating a portion of the carrier fluid flow path in the vicinity of said permeable wall.

10. A method in accordance with claim 9, further comprising supplying carrier fluid directly to said analyzer means during said isolating.

* * * * *